United States Patent [19]

Ogawa

[11] 4,397,011
[45] Aug. 2, 1983

[54] APPARATUS FOR REPRODUCING DISC RECORD

[75] Inventor: Hiroshi Ogawa, Tokyo, Japan

[73] Assignee: Sony Corporation, Tokyo, Japan

[21] Appl. No.: 303,990

[22] Filed: Sep. 21, 1981

[30] Foreign Application Priority Data

Sep. 24, 1980 [JP] Japan ................... 55-132523

[51] Int. Cl.³ .................. G11B 7/02; G11B 17/00
[52] U.S. Cl. ............................ 369/50; 369/59; 369/240; 369/267
[58] Field of Search .......... 369/266, 267, 240, 50, 369/59

[56] References Cited

U.S. PATENT DOCUMENTS 3,939,302  2/1976  Kihara ........................ 369/240
4,223,349  9/1980  Dakin et al. ................. 369/50
4,338,683  7/1982  Furukawa et al. .......... 369/240

FOREIGN PATENT DOCUMENTS 53-159840  12/1978  Japan ............................ 369/59

Primary Examiner—Steven L. Stephan
Attorney, Agent, or Firm—Lewis H. Eslinger; Alvin Sinderbrand

[57] ABSTRACT

An apparatus for reproducing a disc record on which a PCM signal is recorded in run length limited code includes an input terminal for receiving a reproduced signal from the disc record; a detecting circuit for detecting the maximum or minimum transition interval contained in the reproduced signal and for producing a detecting signal in response thereto, and a comparing circuit for comparing the detecting signal with a reference signal corresponding to the maximum or minimum transition interval during the rotation of the disc record at a predetermined velocity, and for producing a control signal in response to said comparisons to be supplied to a servo circuit for controlling the rotation of the disc record.

3 Claims, 6 Drawing Figures

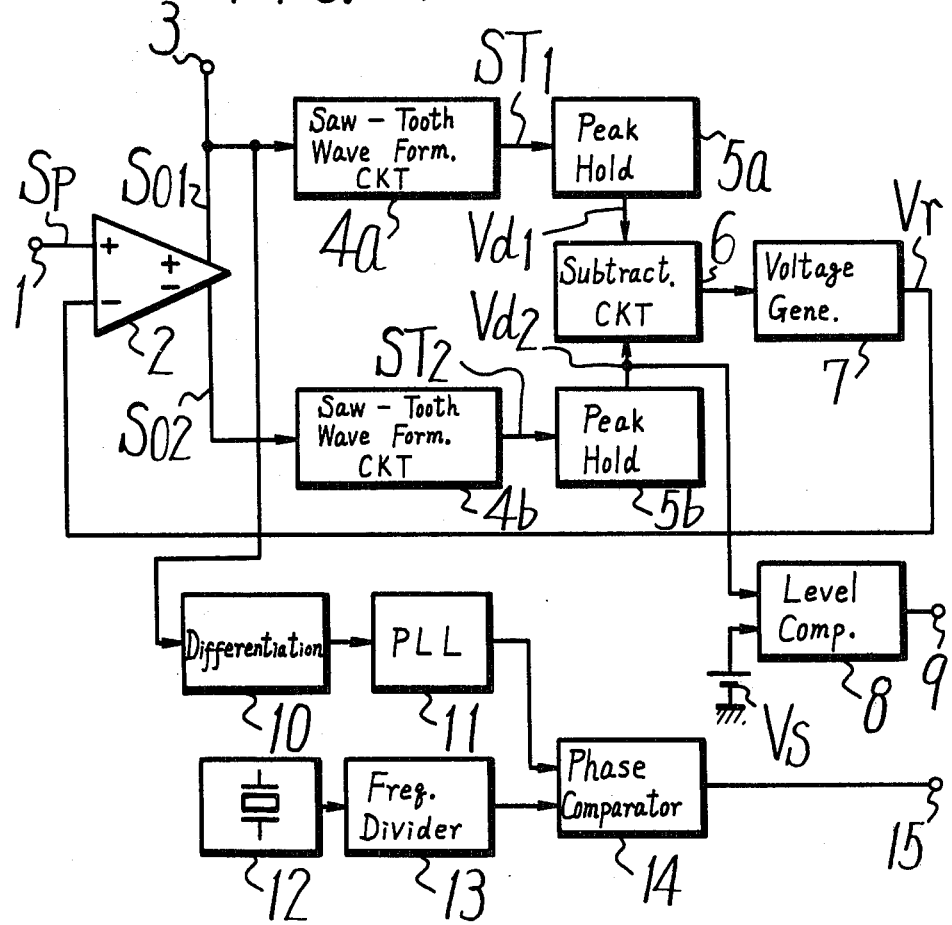
FIG. 1
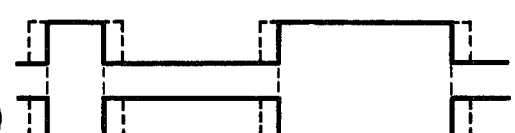
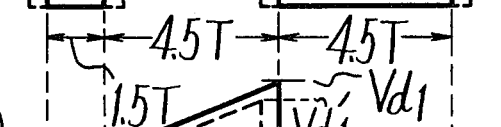
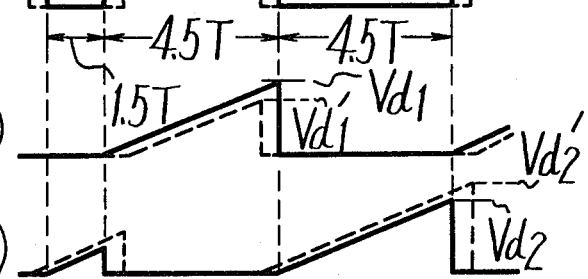
FIG. 2A (S01)
FIG. 2B (S02)
FIG. 2C (ST1)
FIG. 2D (ST2)

APPARATUS FOR REPRODUCING DISC RECORD

BACKGROUND OF THE INVENTION

1. Field of the Invention

The present invention relates generally to an apparatus for reproducing a disc record on which a digital signal is recorded in which the rotational velocity of the disc record is controlled, and is directed more particularly to an apparatus for reproducing a disc record in which the linear velocity of the disc record is maintained at a constant, predetermined value.

2. Description of the Prior Art

At present, a digital-audio disc record has been developed in which a PCM (pulse code modulation) audio signal is recorded on a disc record similar to a video disc and then reproduced. As the reproducing system thereof, a signal detecting system of a mechanical type, optical type, electro-static capacity type or the like similar to that for the video disc record is used. When a PCM audio signal is recorded on a disc record, in order to increase the recording density the linear velocity of the disc record is selected to be constant rather than selecting the angular velocity of the disc record to be constant. When the disc record on which a signal is recorded with a constant linear velocity is reproduced, it is of course necessary that the disc record be reproduced at a constant linear velocity. To this end, a rotational control method for the disc record is known in which the position of a pick-up device is detected by a potentiometer and, since the necessary number of rotations is a reciprocal of the position of the pick-up device, the detected output therefrom is supplied to a divider to obtain control information or data. However, the above method is not so good because the position detector and divider for the control are expensive and complicated in construction.

Further, a method for obtaining the control information or data based upon the reproduced signal from the disc record has been proposed in which the fact that the reproducing system of the optical disc record has a frequency characteristic similar to that of a low pass filter and the rising-up or falling-down time of the reproduced signal is in inverse proportion to the linear velocity of the disc record. The reproduced signal is differentiated and the control information is obtained from the peak value of the differentiated output (as disclosed, for example, U.S. patent application Ser. No. 204,552).

Further, since the cut-off space frequency of the reproducing system of the optical disc record is determined by the open area ratio of the objective lens used for reading-out the disc record and the wave length of a laser beam used therewith, a trouble or complex manner of adjustment must be made for each player or change of the pick-up device.

Further, when disc records having a different linear velocity upon recording are reproduced, adjustment is also necessary.

OBJECTS AND SUMMARY OF THE INVENTION

Accordingly, it is an object of the present invention to provide a disc record reproducing apparatus free from the defects encountered in the prior art.

It is another object of the present invention to provide a disc record reproducing apparatus in which the rotation of a disc record can be controlled by using the reproduced signal from the disc record without employing a detector for detecting the position of a pick-up device used therein.

It is a further object of the present invention to provide a disc record reproducing apparatus in which even when a player and/or a pick-up device is changed or a disc record differing in linear velocity upon recording is reproduced, the rotation can be controlled without any adjustment.

According to an aspect of the present invention, there is provided an apparatus for reproducing a disc record on which a PCM signal is recorded in run length limited code, which comprises:
(a) an input terminal for receiving a reproduced signal from the disc record;
(b) a detecting circuit for detecting the maximum or minimum transition interval contained in the reproduced signal and for producing a detecting signal in response thereto; and
(c) a comparing circuit for comparing the detecting signal with a reference signal corresponding to the maximum or minimum transition interval during the rotating of the disc record at a predetermined velocity and for producing a control signal to be provided to a servo circuit for controlling the rotation of the disc record.

The above, and other objects, features and advantages of the present invention will become apparent from the following description taken in conjunction with the accompanying drawings in which like references designate the same or like elements and parts.

BRIEF DESCRIPTION OF THE DRAWINGS

FIG. 1 is a block diagram showing an embodiment of a disc record reproducing apparatus according to the present invention;

FIGS. 2A, 2B, 2C and 2D are waveform diagrams used to explain the operation of the embodiment of the invention shown in FIG. 1.

DESCRIPTION OF THE PREFERRED EMBODIMENTS

Figure 3:
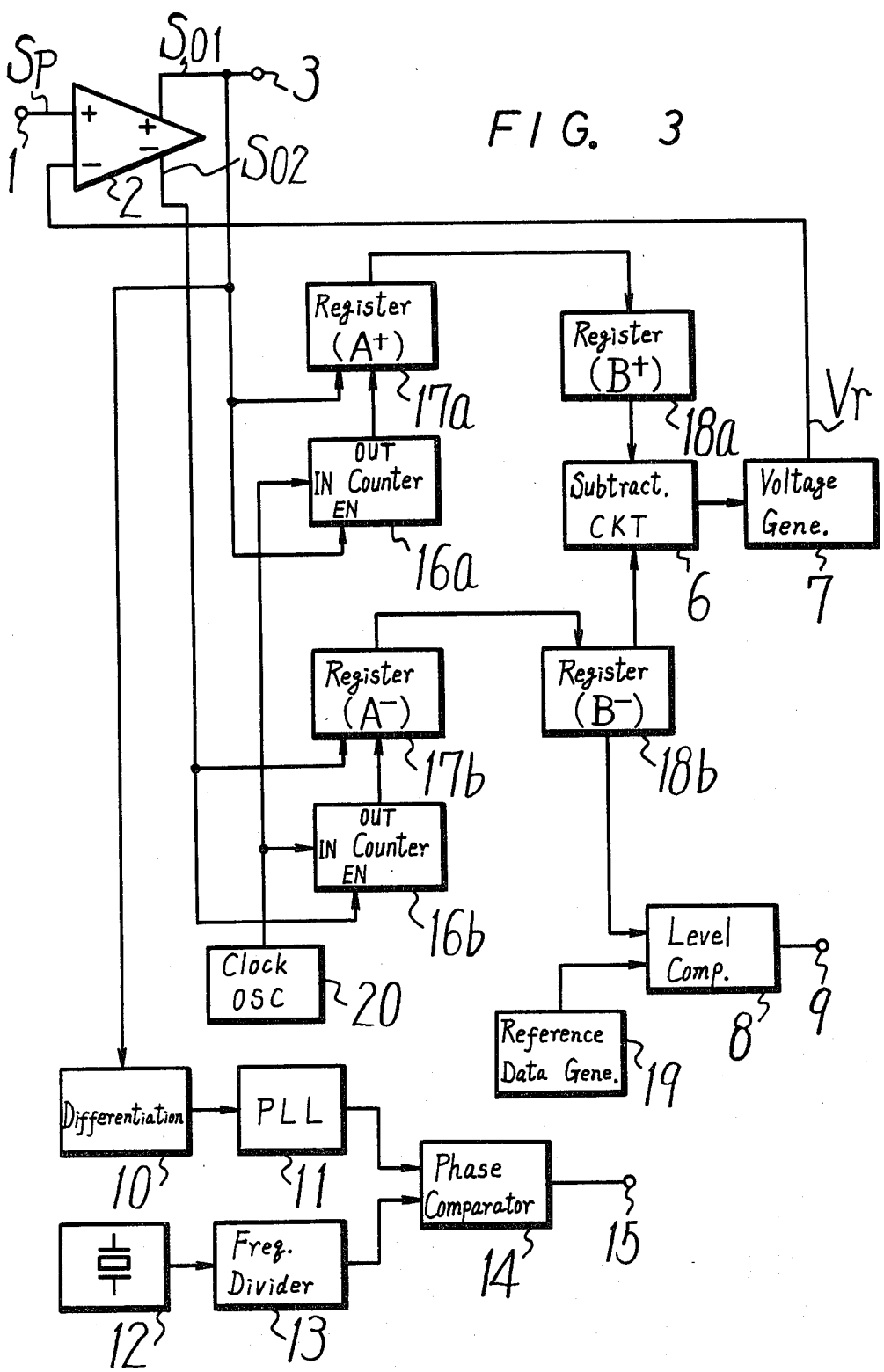
FIG. 3 is a block diagram showing another embodiment of the present invention.

In the present invention, when a signal is recorded at the base band thereof without employing a carrier modulation system such as an amplitude modulation system, a run length limited code modulation system is used. This modulation system has a minimum inversion interval T min between transitions of two data relating to "0" and "1" which is selected to be long enough to increase the recording efficiency. A maximum inversion interval T max is selected to be short, whereby the self clocking action upon reproduction is relatively easily performed. As an example, in a system known as the 3 PM system, T min is 1.5T (where T is the interval of the bit cell of input data) and T max is 6T. According to the present invention, since the inversion interval is limited in length, the deviation of the maximum or minimum inversion interval from a reference value is detected and the rotation of the disc record is controlled to be a constant linear velocity based upon the deviation.

Now, an embodiment of the invention will next be described. In this example of the invention, a modulation system of the run length limited code, is used in which the minimum and maximum inversion intervals are limited to be T min = 1.5T and T max = 4.5T.

This modulation system will next be generally described. When input data are changed from "0" to "1", the inversion takes place at the center of the bit cell of the input data. Also, in case of a pattern of successive "1"'s, the successive "1"'s are sectioned at the boundary of the bit cell at every two or three bits and the inversion is generated at the boundary after the section. Further, in case of successive "0"'s, the inversion is generated at the boundary which satisfies such a condition that it is apart more than 3.5T from the former inversion and also apart by more than 1.5T from the center of the bit cell where the later "1" appears first.

This modulation system can make T max shorter than T max in the other systems utilizing a run length limited code such as the 3 PM system. Further, the modulated output does not include successive T max (=4.5T) in an ordinary modulation system with such a bit pattern, in which two successive inversion intervals of 4.5T occur and the inversion interval of 1.5T occurs previously as a frame synchronizing signal.

According to this invention, the maximum or minimum inversion interval contained in the recorded signal is detected and held. In an alternate embodiment of the invention, the maximum inversion interval (=4.5T) is detected in an analog manner and then held.

Further, in the following embodiment of the invention, the motor which rotates the disc record is controlled. The maximum inversion interval is also detected and held so as to correctly convert a reproduced signal to a pulse signal. In other words, the digital signal which is modulated by the run length limited code is in almost all the cases one whose DC component fluctuates in response to the data content. Thus, even if the reproduced signal is applied to a limiter having a reference level signal with a level which varies to make a fixed level or DC component zero, a pulse signal obtained therefrom is different in length from the recorded signal. Such a run length limited code is scarcely known in which the DC component is 0 and T min is large.

Furthermore, in an optical disc record, the size of the pit (recess) corresponding to "1" or "0" of the recorded signal is uniformly deviated by a predetermined amount for the mastering operation performed in the preparation of a master disc. As a result of the deviation, there is a problem of asymmetry where the ON and OFF ratio of the reproduced signal is not the same as that of the recorded signal. According to the invention, a waveform conversion circuit overcomes the above problems and the recorded signal is reproduced with high fidelity.

Now, one embodiment of the invention will be described with reference to FIGS. 1 and 2. In the example of FIG. 1, a reproduced signal (which is substantially a sine wave) $S_p$ is applied from an input terminal 1 to a limiter 2 at one input terminal and is also supplied at a second input terminal with a reference voltage (limit level) $V_r$. Thus, the limiter 2 produces pulse output signals $S_{o1}$ and $S_{o2}$ which are opposite in phase. In this case, the output signal $S_{o1}$ is in phase with the reproduced signal $S_p$ applied to the input terminal 1 and delivered to an output terminal 3. The output signals $S_{o1}$ and $S_{o2}$ are supplied to saw-tooth wave forming circuits 4a and 4b, respectively, each having the same time constant. Saw-tooth waves $ST_1$ and $ST_2$ derived from the saw-tooth wave forming circuits 4a and 4b are respectively fed to respective peak hold circuits 5a and 5b. Output voltages $Vd_1$ and $Vd_2$ from the peak hold circuits 5a and 5b are both applied to a subtracting circuit 6 and the output or subtracted output (error signal) therefrom is fed to a voltage generating circuit 7 whose output is applied to or fed back to the limiter 2 as the reference voltage $V_r$ as set forth previously. In this case, the voltage generating circuit 7 may be an amplifier.

The saw-tooth wave forming circuits 4a and 4b generate saw-tooth waves $ST_1$ and $ST_2$ with levels which gradually increase with the same slope during the period in which the respective outputs $S_{o1}$ and $S_{o2}$ from the limiter 2 are both zero ("0"). By way of example, such a case will be explained in which the above-mentioned frame synchronizing signal is applied to the input terminal 1 as the reproduced signal $S_p$. At this time, the output signal $S_{o1}$ shown in FIG. 2A and the output signal $S_{o2}$ opposite in phase to the former as shown in FIG. 2B one derived from the limiter 2. The saw-tooth wave forming circuits 4a and 4b supply the saw-tooth waves $ST_1$ and $ST_2$ with levels which gradually increase at predetermined slope during the period where the output signals $S_{o1}$ and $S_{o2}$ are respectively zero ("0"), as shown in FIGS. 2C and 2D. When there is no asymmetry, if the reference level $V_r$ is taken as a predetermined level, the interval of 4.5T where the output signal $S_{o1}$ from the limiter 2 is "0" is equal to the period of 4.5T where the output signal $S_{o1}$ is "1," as indicated by the solid line for FIG. 2A. Similarly, in the output signal $S_{o2}$ from the limiter 2 opposite in phase to the output signal $S_{o1}$, the period 4.5T where the signal $S_{o2}$ from the limiter 2 is "1" is equal to the period of 4.5T where the signal $S_{o2}$ is "0," as indicated by the solid line in FIG. 2B. Accordingly, a peak value $Vd_1$ of the saw-tooth wave $ST_1$ becomes equal to the peak value $Vd_2$ of the saw-tooth wave $ST_2$. Hence the output or error signal from the subtracting circuit 6 becomes zero. At this time, the reference voltage $V_r$ derived from the voltage generating circuit 7 becomes the predetermined level.

Further, when there is asymmetry, the pulse width of the output signal $S_{o1}$ from the limiter 2 where it is "1" becomes wide and the period where the signal $S_{o1}$ is "0" becomes narrow, as shown in FIG. 2A by the broken line, and the output signal $S_{o2}$ opposite in phase to the signal $S_{o1}$ is changed as shown in FIG. 2B by the broken line. Then, the peak value of the saw-tooth wave $ST_1$ becomes low as indicated at $Vd_1'$ by the broken line in FIG. 2C while the peak value of the saw-tooth wave $ST_2$ goes up as indicated at $Vd_2'$ by the broken line in FIG. 2D. Thus, an error signal of $Vd_1' - Vd_2' = -\Delta V$ is generated from the subtracting circuit 6. The level of the reference voltage $V_r$ derived from the voltage generating circuit 7 is increased by the error signal $\Delta V$, and the circuit is controlled so that the error $\Delta V$ becomes zero ($\Delta V = 0$), whereby the fluctuation of the pulse width by the asymmetry can be eliminated. While, when the direction of the pulse width deviation by the asymmetry is opposite to that shown in FIGs. 2A and 2B, the polarity of the error signal becomes positive. In this case, the circuit is so controlled that the level of the reference voltage $V_r$ becomes low.

Further, when a pattern with the inversion interval exceeding the maximum inversion interval T max (in the above case, 4.5T) of the modulation system is used as the frame synchronizing signal and must be distinguished from the data, it is enough that the inversion interval of the synchronizing signal is detected and held. In short, the maximum or minimum inversion interval in the inversion interval contained in the reproduced signal is detected and held.

The output or peak value $V_{d1}$ or $V_{d2}$ from the peak hold circuit 5a or 5b has a level corresponding to the length of the maximum inversion interval ($=4.5T$) in the reproduced signal. Accordingly, if it is assumed that a predetermined length of the bit cell of a PCM audio signal is taken as T, the level of the output or peak level $V_{d1}$ or $V_{d2}$ from the peak hold circuit 5a or 5b to which the inversion interval of 4.5T is applied is taken as a velocity reference voltage $V_s$. If the difference in level between the velocity reference voltage $V_s$ and the peak level $V_{d1}$ or $V_{d2}$ is detected, the deviation amount from the linear velocity upon recording can be detected. In the example of the invention shown in FIG. 1, the output $V_{d2}$ from the peak hold circuit 5b and the velocity reference voltage $V_s$ are applied to a level comparator 8 which the generates a velocity control signal which is supplied to an output terminal 9. The velocity control signal is supplied to a drive circuit of a motor (not shown) which rotates the disc record.

Further, in order to control the rotation of the disc record to be very low in wow and flutter and high in accuracy, the output signal $S_{o1}$ from the limiter 2 is applied through a differentiation circuit 10 to a PLL (phase locked loop) circuit 11. In this case, the differentiation circuit 10 may be a digital circuit which employs, for example, an exclusive OR gate. The output from the PLL circuit 11 is a reproduced clock signal having a bit frequency which has the same time base fluctuation as that of the reproduced signal. The reproduced clock signal is then supplied to a phase comparator circuit 14 which is also supplied with a signal derived by frequency-dividing the output from a quartz oscillator 12 through a frequency divider 13. The compared output from the phase comparator circuit 14 is delivered to an output terminal 15. This compared output is also supplied to the motor drive circuit as the velocity control signal.

The velocity control signal obtained at the output terminal 9 is used to assist the PLL circuit 11 in carrying out the normal phase lock. Since the PLL circuit 11 has a limited capture range and lock range, unless the velocity control signal delivered to the output terminal 9 is used, it is impossible for the rotational phase of the disc record to be locked to the output from the quartz oscillator 12 following a large linear velocity variation caused by the scanning position of the pick-up device.

FIG. 3 illustrates an alternate embodiment of the present invention. This embodiment detects the maximum inversion interval in a digital manner and holds the detected interval in a different manner than the manner of the previous embodiment of the invention. In the embodiment of the invention shown in FIG. 3, as in the first embodiment of the invention, there is provided a limiter 2 which is supplied with the reference voltage $V_r$ from the voltage generating circuit 7 and the reproduced signal $S_p$ from the input terminal 1. The output signals $S_{o1}$ and $S_{o2}$ derived from the limiter 2 which are opposite in phase are respectively supplied to enable terminals EN of counters 16a and 16b which count the clock pulse (which has a frequency sufficiently higher than that of the data) from a clock oscillator 20 during the period in which the signals $S_{o1}$ and $S_{o2}$ are "0". When the respective signals $S_{o1}$ and $S_{o2}$ change to "1" from "0", the outputs from the counters 16a and 16b are respectively supplied to registers 17a and 17b. The counters 16a and 16b are subsequently cleared during the period in which the signals $S_{o1}$ and $S_{o2}$ are "1". Registers 18a and 18b are connected to the registers 17a and 17b, respectively, and the contents of the registers 17a and 17b are transferred to the registers 18a and 18b, respectively, in accordance with the magnitude of the values A+ and A− stored in the registers 17a and 17b and also the values B+ and B− stored in the registers 18a and 18b. In other words, if the conditions A+ >B+ and A− >B− are both satisfied, the values A+ and A− are taken in by the registers 18a and 18b respectively, while if the conditions A+ ⩽ B+ and A− ⩽ B− are both satisfied, the contents of the registers 18a and 18b are both unchanged.

As described above, the data corresponding to the maximum values of the inversion intervals relating to the positive and negative polarities are stored in the respective registers 18a and 18b and the contents thereof are both supplied to the substracting circuit 6. Therefore, similar to the first embodiment of the invention, an error signal is produced from the subtracting circuit 6 and the voltage generating circuit 7 produces the reference voltage $V_r$ which will make the error signal become zero.

In this embodiment, the registers 18a and 18b are each formed so that their contents B+ and B− are reduced gradually at a certain unit time corresponding to the discharging time constant of the peak hold. In a practical embodiment, the registers 18a and 18b are each formed of a counter to which a subtracting input is applied. The unit time when the subtracting input is applied is determined in consideration of the period or interval when the maximum inversion interval (in the above example, the frame period) appears.

The contents B− of the register 18b are supplied to a digital level comparator 8 (which may be a subtractor) to be compared with reference data (corresponding to the reference voltage $V_s$ in the embodiment of FIG. 1) from a reference data generator circuit 19. A motor control signal is derived from the level comparator circuit 8 and delivered to an output terminal 9. The servo circuit including the PLL circuit 11 and quartz oscillator 12 is similar to the embodiment of FIG. 1.

As will be understood from the above explanation of the embodiments according to the present invention, the disc record can be reproduced at a constant linear velocity without using a detector to detect the position of the pick-up device and the divider which is supplied with the detected signal. Accordingly, the construction of the rotational circuit can be simple and inexpensive.

Further, according to the invention, in contradistinction to a device in which the control information is derived at the time of the rising-up or the falling-down of the reproduced signal, no adjustment is necessary at each time the player or pick-up device is changed.

Further, with the present invention, the maximum value of the inversion interval in the reproduced signal is determined by the modulation system of the run length limited code used or by the synchronizing pattern and the bit rate. Accordingly, if the modulation system of the signal recorded on the rotary disc and the format of the synchronizing pattern, bit rate and so on are determined, the level of the velocity reference voltage $V_s$ corresponding to the maximum value of the inversion interval becomes a predetermined value.

With the present invention, a rotational control is carried out so that the detected output coincides with the velocity reference voltage $V_s$. Accordingly, if the format is the same, even though disc records different linear velocities upon recording, the disc records can be automatically rotated for reproduction at the velocity as used for recording.

According to the present invention, the servo circuit including the PLL circuit 11 and the quartz oscillator 12 can be omitted, and substantially the same effect can be achieved.

Further, the circuit construction for performing similar rotational control at a high accuracy can include various modifications and changes.

The above description is given for preferred embodiments of the invention, but it will be apparent that many other modifications and variations can be effected by one skilled in the art without departing from the spirit or scope of the invention as defined by the appended claims.

I claim as my invention:

1. An apparatus for reproducing a disc record on which a PCM signal is recorded in run length code, said apparatus comprising:
   (a) an input terminal for receiving a reproduced signal from the disc record;
   (b) a detecting circuit for detecting the maximum or minimum transition interval contained in said reproduced signal and for producing a detecting signal in response thereto; and
   (c) a comparing circuit for comparing said detecting signal with a reference signal corresponding to the maximum or minimum transition interval during rotation of the disc record at a predetermined velocity and for producing a control signal to be provided to a servo circuit for controlling the rotation of the disc record.

2. An apparatus according to claim 1, wherein said detecting circuit includes a saw-tooth wave generator for providing a saw-tooth wave during predetermined transition intervals of said reproduced signal and a peak-hold circuit for holding a peak value of the amplitude of said saw-tooth wave and for providing said comparing circuit with said peak value.

3. An apparatus according to claim 1, wherein said detecting circuit includes clock generating means for generating a clock signal having a shorter period that said maximum transition interval, counter means for counting said clock signal during predetermined transition intervals of said reproduced signal, first register means for receiving the value contained in said counter means, second register means for receiving the value contained in said first register means as said detecting signal when the value contained in said second register means is smaller than the value contained in said first register means, and wherein said comparing circuit is provided with the value contained in said second register means as the detecting signal and a reference data signal as said reference signal.

* * * * *